(12) United States Patent
Lee et al.

(10) Patent No.: US 7,460,452 B2
(45) Date of Patent: Dec. 2, 2008

(54) SYSTEM AND METHOD FOR RESTORING AN OPTICAL DISC SIGNAL

(75) Inventors: Soo-woong Lee, Seongnam-si (KR); Dae-woong Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 798 days.

(21) Appl. No.: 10/964,265

(22) Filed: Oct. 13, 2004

(65) Prior Publication Data

US 2005/0083821 A1    Apr. 21, 2005

(30) Foreign Application Priority Data

Oct. 16, 2003    (KR) .................. 10-2003-0072141

(51) Int. Cl.
*G11B 20/10*    (2006.01)
(52) U.S. Cl. ................ 369/47.35; 369/59.17
(58) Field of Classification Search ............ None
See application file for complete search history.

(56) References Cited

U.S. PATENT DOCUMENTS

| | | | | |
|---|---|---|---|---|
| 5,986,592 A | * | 11/1999 | Nakagawa et al. ........... 341/94 |
| 6,104,682 A | * | 8/2000 | Konishi ................... 369/44.34 |
| 6,392,569 B1 | * | 5/2002 | Mimachi et al. ............. 341/58 |
| 2002/0060596 A1 | * | 5/2002 | Shim et al. .................. 327/307 |
| 2003/0123362 A1 | * | 7/2003 | Graffouliere ............. 369/53.34 |

* cited by examiner

*Primary Examiner*—Joseph Feild
*Assistant Examiner*—Christopher R Lamb
(74) *Attorney, Agent, or Firm*—F. Chau & Associates, LLC

(57) ABSTRACT

Provided are a restoration system and method for an optical disc, by which a radio frequency signal optically picked up from an optical disc is restored. The restoration system includes a slice, a phase locked loop, a latch circuit, a 3T correction circuit, and a demodulator. In particular, the 3T correction circuit includes an extension storage device, a length measuring device, a phase detector, and an extension determiner and corrects data output from the extension storage device. In the restoration method, data required for determining the need for correction and the direction of correction is detected and a plurality of steps for selecting non-correction, two directional correction, forward correction, and backward correction are performed, thereby correcting the high radio frequency signal according to conditions of the high radio frequency signal. It is preferable that the restoration system operates according to the restoration method.

19 Claims, 4 Drawing Sheets

SYSTEM AND METHOD FOR RESTORING AN OPTICAL DISC SIGNAL

CROSS REFERENCE TO RELATED APPLICATION

This application claims the priority of Korean Patent Application No. 2003-72141, filed on Oct. 16, 2003, in the Korean Intellectual Property Office, the disclosure of which is hereby incorporated by reference in its entirety.

TECHNICAL FIELD

The present invention relates to correcting an error in a restored signal and more particularly to restoring a radio frequency (RF) signal optically picked up from the optical disc.

DISCUSSION OF THE RELATED ART

Data stored in Compact Discs (CDs) are encoded using eight bit-to-fourteen bit modulation (hereinafter, referred to as "EFM") and data stored in digital versatile discs (DVDs) are encoded using eight bit-to-sixteen bit modulation (hereinafter, referred to as "EFM+"). An EFM signal is formatted such that the same logic value does not consecutively occur more than a predetermined number of times. This is done, so as to remove direct current components during playback and facilitate clock recovery.

In the case of CDs, pits with information are serially arranged and tracks, in which the pits are arranged, are arranged concentrically with a track pitch of 1.6. The lengths of the pits and the spaces between the pits are classified into nine values, i.e., 3T through 11T, based on the widths of clock pulses. Here, the term 'T' represents a period of one clock pulse; and the terms 3T and 11T represent the period of three clock pulses and the period of eleven clock pulses, respectively.

It is difficult to manufacture optical discs having uniform surfaces due to material characteristics of the optical discs and inherent constraints present in optical disc manufacturing techniques. Also, a constant shape and size of a region of the surface of an optical disc, on which a light beam is projected, cannot be maintained due to mechanical imperfections of optical pickup devices. Hence, the wavelength of an RF signal optically picked up from an optical disc may fall outside a specified range, resulting in an error in the EFM signal.

To record more information on an optical disc, pits on the optical disc should have a high density. Hence, as a result, the interference between the adjacent pits increases noise in the RF signal, causing an increase in the error rate of EFM data. In particular, 3T, which appears most frequently, is most affected by an error due to noise arising from interference. As a result, pit length of 3T appears to have decreased due to interferences among adjacent pits, and thus 3T may be wrongly considered as 1T or 2T. In this case, the EFM demodulation cannot be performed properly, resulting in an error in data demodulated by EFM.

In a conventional apparatus that attempts to solve this problem, phase errors are measured at the positive edges of pulses of an EFM signal having lengths of less than 3T. Signal phases are compared at the positive edges. If it is determined that a loss of 1T occurs at the positive edge which shows the larger phase, and the measured phase error is corrected. In this case, to measure the phase error, the level of an optically picked up RF signal is converted into the phase error using an analog-to-digital converter (ADC). Alternately, a phase error between a normal clock signal and an EFM signal that results from modulation of the RF signal is measured using a signal with a frequency that is much higher than that of the normal clock signal.

FIG. 1 is a block diagram of a conventional restoration system for an optical disc.

Referring to FIG. 1, the conventional restoration system includes a slice 110, a clock recovery phase locked loop (clock recovery PLL) 120, a latch circuit 130, and a demodulator 140. The slice 110 samples an RF signal that is optically picked up. The clock recovery PLL 120 receives a signal EFMI from the slice 110 and generates a channel clock signal PCLK. The latch circuit 130 receives the signal EFMI from the slice 110 and the channel clock signal PCLK from the clock recovery PLL 120 to output the signal EFMNRZI in synchronization with the channel clock signal PCLK. The demodulator 140 demodulates the signal EFMNRZI received from the latch circuit 130.

For error correction, the conventional restoration system must include an ADC or else requires a signal with a higher frequency than a normal clock signal. However, it is not desirable for the restoration system to include an ADC, because a large board size would be required to accommodate the ADC. Also, it is not economical to provide a signal with a higher frequency than the normal clock signal from the outside of an integrated circuit (IC) chip or install a signal generator for such a signal in a board. Also, such a process makes the optical disc system complex and, in particular, is not suitable for high-speed operations. Hence, there is a need for a restoration system and method for restoring a signal for an optical disc.

SUMMARY OF THE INVENTION

At least one embodiment of the present invention provides a restoration system, which performs error correction by using a sliced signal and a channel clock signal, without using an ADC or a clock signal with a higher frequency than the channel clock signal.

An aspect of the present invention also provides a restoration method by which error correction is performed by using a sliced signal and a channel clock signal.

According to one aspect of the present invention, a restoration system is provided that optically picks up information from an optical disc and restores the information. The restoration system comprises a slice circuit, a phase locked loop, a latch circuit, a 3T correction circuit, and a demodulator. The slice samples a signal optically picked up from the optical disc. The phase locked loop receives a signal output from the slice and generates a channel clock signal. The latch circuit receives the signal output from the slice and the channel clock signal; and the latch circuit outputs the signal output from the slice in response to the channel clock signal. The 3T correction circuit receives the channel clock signal, the signal output from the slice, and the signal output from the latch circuit and outputs a signal in which 3T is corrected. The demodulator demodulates the signal output from the 3T correction circuit.

The 3T correction circuit includes an extension storage device, a length measuring device, a phase detector, and an extension determiner. The extension storage device stores the signal output from the latch circuit in a predetermined storage device in response to the channel clock signal of the PLL, outputs a storage state, and outputs stored data in response to a signal output from an extension determiner. The length measuring device receives the storage state from the extension storage device, detects a period (2T/1T) of a predetermine pulse of the storage state, measures periods of previous and next pulses respectively before and after the predetermined pulse signal, and outputs a current length of the predetermined pulse, a previous length of the previous pulse, and a next length of the next pulse according to a measurement of the periods. The phase detector measures a phase difference between the channel clock signal and the signal output from the slice.

The phase detector thereafter outputs, according to a measurement, a leading phase, which indicates a difference between the signal output from the slice and the channel clock signal when the predetermined pulse is enabled; a trail phase, which indicates a difference between the signal output from the slice; the channel clock signal when the next pulse is enabled; and a previous phase, which indicates a difference between the signal output from the slice and the channel clock signal when the previous pulse is enabled. The extension determiner receives the current length, the previous length, the next length, the leading phase, the trail phase, and the previous phase and determines a need for a correction and a direction of the correction.

The extension storage device includes a plurality of shift registers.

According to another aspect of the present invention, a restoration method is provided. The method restores a signal in which 3T is corrected by using a signal output from a slice that samples a signal optically picked up from an optical disc; a channel clock signal output from a phase locked loop that receives a signal output from the slice; and a signal output from a latch circuit that receives the signal output from the slice and the channel clock signal and outputs the signal output from the slice in synchronization with the channel clock signal.

The method includes detecting a current length of a current pulse of the signal output from the latch circuit; a previous length of a previous pulse immediately before the current pulse; and a next length of a next pulse immediately after the current pulse. Further, the method detects a leading phase, which indicates a difference between the channel clock signal and the signal output from the slice when the signal output from the slice is enabled; a trail phase, which indicates a difference between the signal output from the slice and the channel clock signal when the next pulse is enabled; and a previous phase, which indicates a difference between the signal output from the slice and the channel clock signal when the previous phase is enabled. Further, the method involves determining whether the current length is less than 2T; selecting a two directional correction or a non-correction if the current length is less than 2T; and selecting a forward correction or a backward correction if the current length is equal to 2T.

The selection of one of the two directional correction and non-correction includes determining whether the current length is equal to 1T; selecting the non-correction if the current length is not equal to 1T; selecting the non-correction when both the previous length and the next length are less than or equal to 3T; and selecting the two directional correction when both the previous length and the next length are greater than 3T, if the current length is equal to 1T.

The selection of one of non-correction, forward correction, and backward correction results into selecting the non-correction if both the next length and the previous length are less than or equal to 3T. The selection technique results into selecting the forward correction if the previous length is greater than 3T and the next length is less than or equal to 3T. Further, the selection technique results into selecting the backward correction if the previous length is less than or equal to 3T and the next length is greater than 3T. Further, the technique can select the forward correction if both the next phase and the trail phase have a first phase error or the previous phase has a second phase error, when both the previous length and the next length are greater than 3T. However, the backward correction is selected if both the next phase and the trail phase have the second phase error or the previous phase has the first phase error, when both the previous length and the next length are greater than 3T.

The first phase error indicates that the signal output from the slice is fast and the second phase error indicates that the signal output from the slice is slow.

BRIEF DESCRIPTION OF THE DRAWINGS

Preferred embodiments of the invention are described with reference to the accompanying drawings, of which.

DETAILED DESCRIPTION OF PREFERRED EMBODIMENTS

The preferred embodiments of the present invention will be described with reference to the appended drawings.

Figure 1:
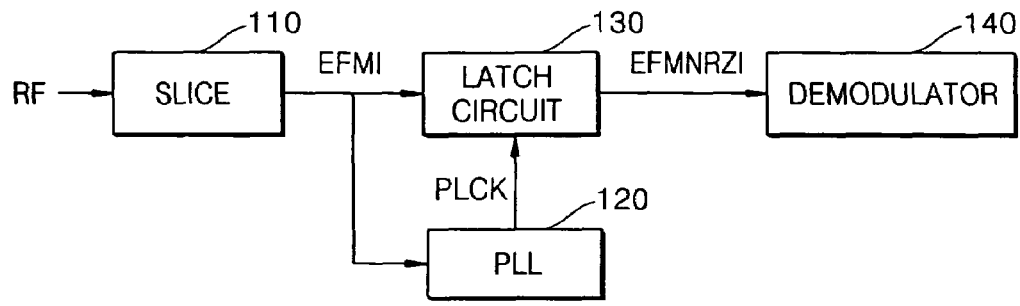
FIG. 1 is a block diagram of a conventional restoration system for an optical disc.
Figure 2:
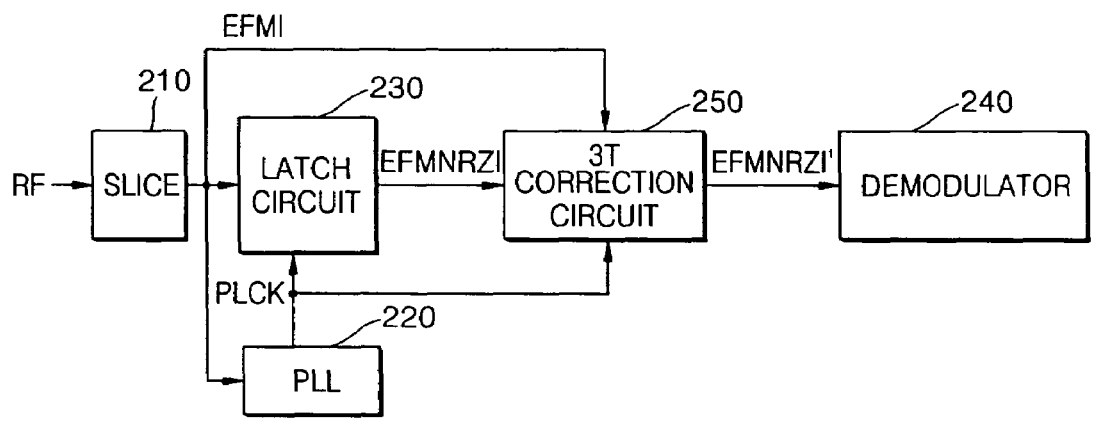
FIG. 2 is a block diagram of a restoration system for an optical disc according to an exemplary embodiment of the present invention.

FIG. 2 is a block diagram of a restoration system for an optical disc according to an exemplary embodiment of the present invention.

Referring to FIG. 2, the restoration system for an optical disc includes a slice 210, a PLL 220, a latch circuit 230, a 3T correction circuit 250, and a demodulator 240.

The slice 210 samples an analog signal RF that is optically picked up from an optical disc. The PLL 220 receives a signal EFMI from the slice 210 and generates a channel clock signal PCLK. The latch circuit 230 receives the signal EFMI from the slice 210 and the channel clock signal PCLK and outputs a signal EFMNRZI in synchronization with the channel clock signal PCLK. The 3T correction circuit 250 receives the signal EFMNRZI from the latch circuit 230, the signal EFMI from the slice 210, and the channel clock signal PCLK from the PLL 220 and outputs a signal EFMNRZI' in which a 3T pit length is corrected. The demodulator 240 demodulates the signal EFMNRZI' output from the 3T correction circuit 250.

Figure 3:
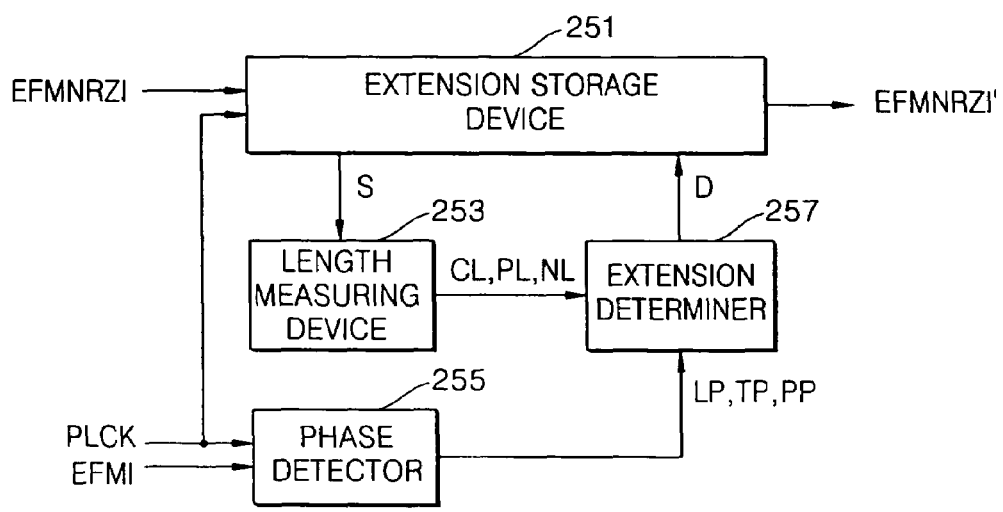
FIG. 3 is a block diagram of a 3T correction circuit of FIG. 2.

FIG. 3 is a block diagram of the 3T correction circuit 250 of FIG. 2.

Referring to FIG. 3, the 3T correction circuit 250 includes an extension storage device 251, a length measuring device 253, a phase detector 255, and an extension determiner 257.

The extension storage device 251 stores the signal EFMNRZI in a predetermined storage device (not shown) in response to the channel clock signal PLCK, outputs a storage state S of the predetermined storage device to the length measuring device 253, and outputs stored data signal EFM- NRZI in response to a signal D received from the extension determiner 257. It is preferable that the predetermined storage device is implemented using a shift register.

The length measuring device 253 receives the storage state S from the extension storage device 251, if it detects a 2T/1T pit length, measures the lengths of the pulse before and after the pulse measured at a pit length of 2T/1T, and outputs a current length CL, a previous length PL, and a next length NL based on the measurement.

The phase detector 255 measures a phase difference between the channel clock signal PLCK and the signal EFMI and outputs a leading phase LP, a trail phase TP, and a previous phase PP based on the measurement. The extension determiner 257 receives the current length CL, previous length PL, next length NL, lead phase LP, trail phase TP, and previous phase PP, determines the need for correction and the direction of correction, and outputs the signal D for executing correction to the extension storage device 251.

The current length CL, previous length PL, next length NL, leading phase LP, trail phase TP, and previous phase PP will now be described with reference to FIG. 4.

Figure 4:
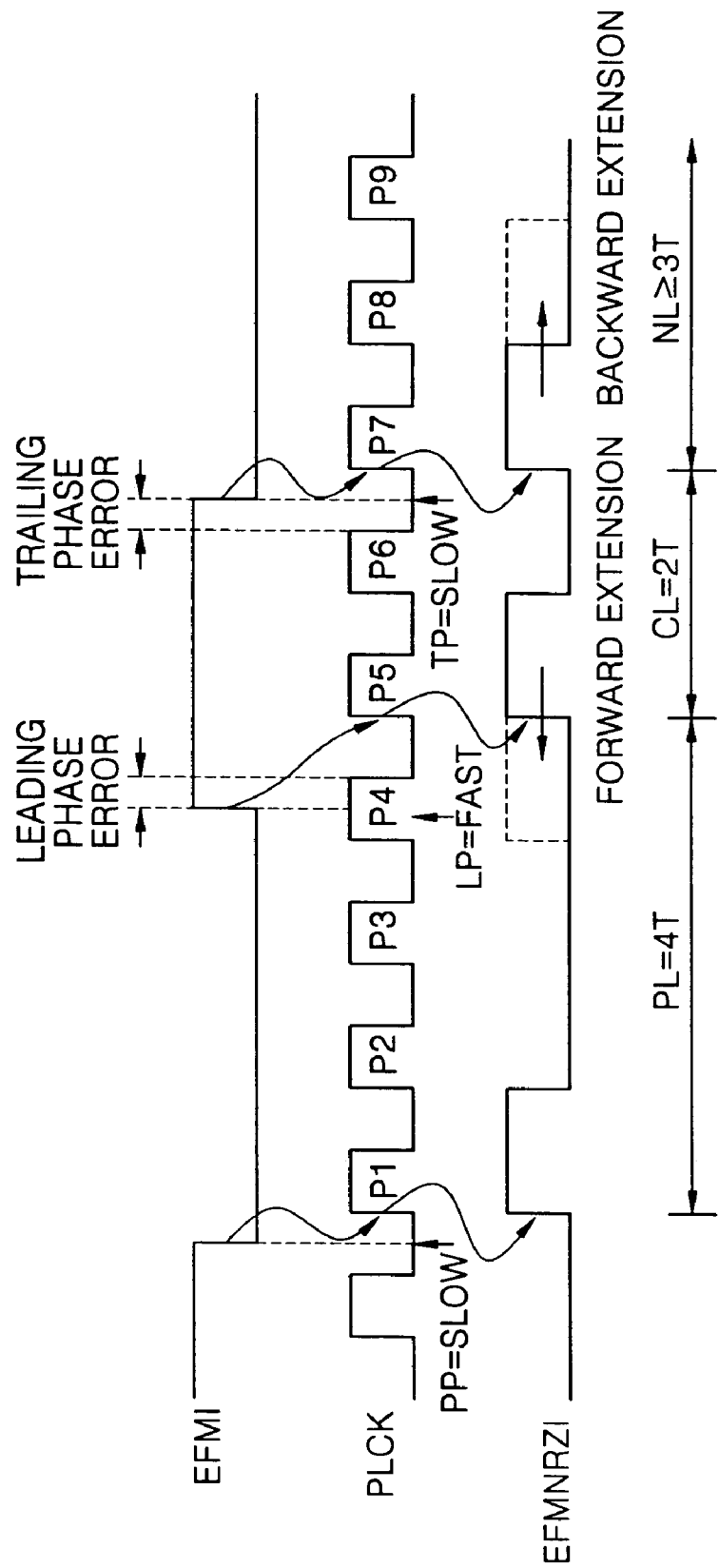
FIG. 4 is a timing diagram of internal signals of a 3T correction circuit of FIG. 3.

FIG. 4 is a timing diagram of internal signals of the 3T correction circuit 250 of FIG. 3.

Referring to FIG. 4, the phase detector 255 classifies a phase error between the output signal EFMI of the slice 210 and the channel clock signal PLCK into a leading phase error (LPE) and a trailing phase error (TPE) and classifies the LPE and the TPE as either fast or slow.

In other words, when the PLL 220 locks a low state of the channel clock signal PLCK at an edge of the signal EFMI, if the channel clock signal PLCK is at a logic high ('1') at an edge of the signal EFMI, then the signal EFMI is ahead of the channel clock signal PCLK and is expressed as fast. On the other hand, when the signal EFMI is behind the channel clock signal PCLK, the signal EFMI is expressed as slow. Thus, as illustrated in FIG. 4, the previous phase PP is slow, the leading phase LP is fast, and the trial phase TP is slow.

Referring to FIG. 4, the previous length PL is 4T, the current length CL is 2T, and the next length NL is greater than or equal to 3T. Since the CL is equal to 2T, the signal EFMNRZI, which is output from the latch circuit 230 in response to the signal EFMI and the channel clock signal PLCK, has an error. The error occurs when the length of the signal EFMI is less than 3T and the length of the signal EFMI corresponding to the channel clock signal PLCK, i.e., corresponding to P4 through P6, is greater than 2T but smaller than 3T. Here, T denotes the period of a pulse of the channel clock signal PLCK. If the extension determiner 257 determines that an error needs to be corrected considering a predetermined condition (which will be described below), the error is corrected through either forward extension, backward extension, or both directional extension.

Figure 5:
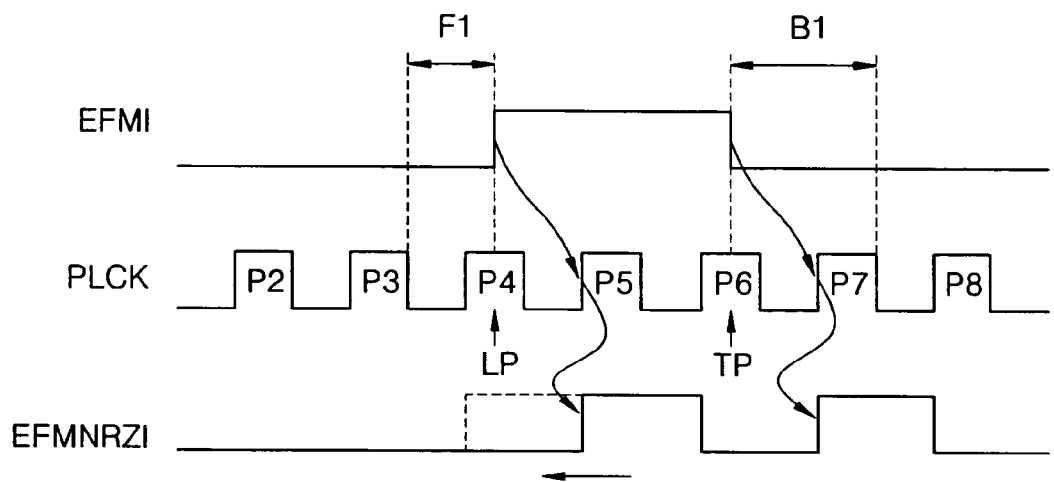
FIG. 5 is a timing diagram of internal signals of the 3T correction circuit of FIG. 3 when a leading phase LP is fast and a trail phase TP is fast.
Figure 6:
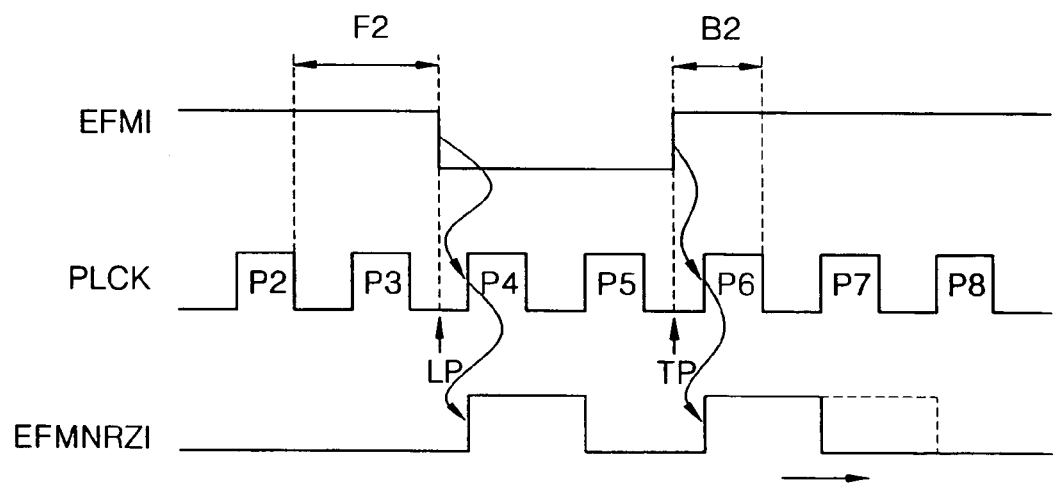
FIG. 6 is a timing diagram of internal signals of the 3T correction circuit of FIG. 3 when a leading phase LP is slow and a trail phase TP is slow.

FIG. 5 is a timing diagram of the internal signals of the 3T correction circuit 250 (shown in FIG. 3), when the leading phase LP is fast and the trail phase TP is fast. FIG. 6 is a timing diagram of the internal signals of the 3T correction circuit 250 of FIG. 3 when the leading phase LP is slow and the trail phase TP is slow.

Referring to FIGS. 5 and 6, error rates can be compared according to logic states of the channel clock signal PLCK at both edges of the signal EFMI. It will be assumed for the sake of illustration that both edges are reduced when 3T is reduced to 2T, two cases should be considered. A first case being F1 in which a leading edge of the signal EFMI occurs before a rising edge of the channel clock signal PCLK; and a second case being B1 in which a trailing edge of the signal EFMI occurs before a rising edge of the channel clock signal PLCK.

Referring to FIG. 5, when the leading phase LP and the trail phase TP are fast, if 1T is reduced in the forward direction, a phase error ranging from 0.5T to 1T occurs in the case F1. If 1T is reduced in the backward direction, a phase error ranging from 1T to 1.5T occurs in the case B1. Thus, the probability of the occurrence of the error in the case F1 is greater than the error in the case B1. Hence, a forward extension is used for error correction.

Referring to FIG. 6, when both the LP and the TP are slow, if 1T is reduced in the backward direction, a phase error of 0.5T to 1T occurs in a case B2. If 1T is reduced in the forward direction, a phase error of 1T to 1.5T occurs in a case F2. Thus, it is determined that the error in the case B2 is higher than the error in the case F2. Thus, a backward extension is used for error correction.

In FIGS. 5 and 6, both the LP and the TP are fast or slow. However, when the LP and the TP have different values, if the PP is slow, there is a high probability that the leading edge of the signal EFMI occurs before the rising edge of the channel clock signal PLCK. On the other hand, if the PP is fast, there is a high probability that the trailing edge of the signal EMI occurs before the rising edge of the channel clock signal PLCK. Thus, a forward extension and a backward extension are used respectively for the two cases.

Figure 7:
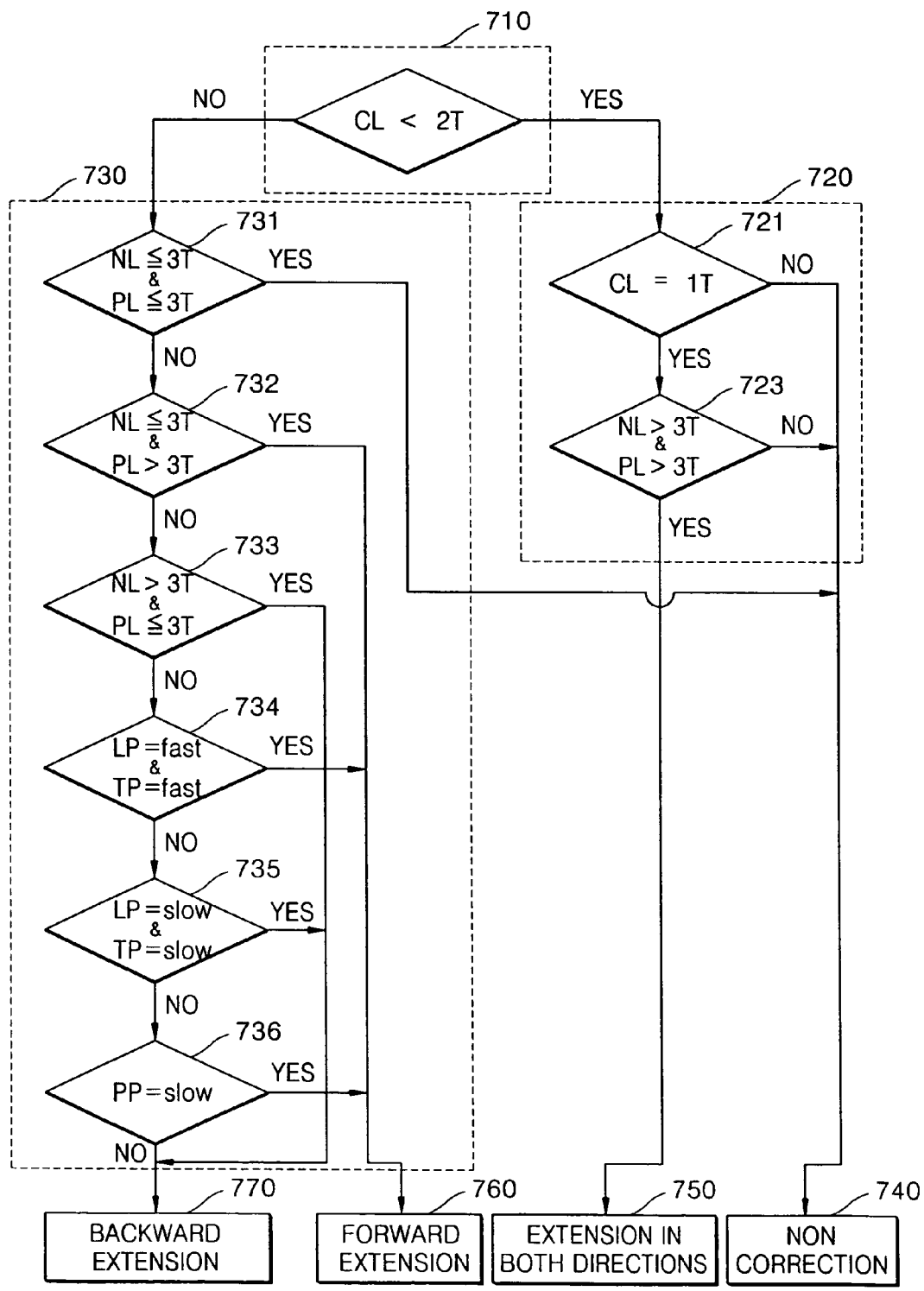
FIG. 7 is a signal flowchart illustrating a determination procedure of an extension determiner of FIG. 3.

FIG. 7 is a signal flowchart illustrating a determination procedure of the extension determiner 257 of FIG. 3.

Referring to FIG. 7, the determination procedure of the extension determiner 257 can be classified into a detection step (not shown), a first determination step 710, a second determination step 720, a third determination step 730, non-correction 740, two directional extension correction 750, forward extension correction 760, and backward extension correction 770.

The detection step includes detecting a current length CL during a predetermined period of the signal EFMNRZI, a previous length PL of the pulse immediately before a pulse having the current length CL; a next length NL of the pulse immediately after the pulse having the current length CL; a lending phase LP, which indicates an error between the signal EFMI and the current clock signal PLCK when the signal EFMNRZI is enabled; a trail phase TP, which indicates an error between the signal EFMI and the channel clock signal PLCK when the pulse immediately after the pulse having the current length CL is enabled; a previous phase PP, which indicates an error between the signal EFMI; and the channel clock signal PLCK when the pulse immediately after the pulse having the current length CL is enabled.

In the first determination 710, it is determined whether the current length CL is less than 2T. If the current length CL is 3T, a normal operation is performed and error correction is not required. Error correction is considered only when the current length CL is less than 3T.

In second determination step 720, if the current length CL is not equal to 1T, no correction is selected (sub-determination step 721). If the current length CL is equal to 1T, and further if both the next length NL and the previous length PL are greater than 3T, then the two directional correction is selected. But if one of the next length NL and the previous length PL is less than or equal to 3T, no correction is selected (sub-determination step 723).

In third determination step 730, the current length CL is equal to 2T. If both the next length NL and the previous length PL are less than or equal to 3T (731), no correction is selected (740). If the previous length PL is greater than 3T and the next length NL is less than or equal to 3T (732), a forward extension is selected (760). If the previous length PL is less than or equal to 3T and the next length NL is greater than 3T (733), a backward extension is selected (770).

When both the previous length PL and the next length NL are greater than 3T, if the both leading phase LP and the trail phase TP have a first phase error (734) or the PLL has a second phase error (736), a forward extension is selected (760). However, if both the leading phase LP and the trail phase TP have the second phase error (735) or the previous phase PP has the first phase error (736), a backward extension is selected (770).

It is preferable that the first phase error indicates that the signal EFMI is fast and the second phase error indicates that the channel clock signal PCLK is slow.

Those skilled in the art will appreciate that the block diagram of FIG. 3 and the signal flowchart of FIG. 7 are shown as only examples for illustration and understanding purposes, and may vary under different conditions.

As described above, the restoration system and method for an optical disc according to at least one embodiment of the present invention performs error correction using a sliced signal (EFMI) and a channel clock signal (PLCK) commonly used in a system, without using an ADC or a clock signal having a higher frequency than the channel clock signal. This results in achieving improved reliability of restoration in an optical disc system.

While the present invention has been particularly shown and described with reference to an exemplary embodiment thereof, it will be understood by those of ordinary skill in the art that various changes in form and details may be made therein without departing from the spirit and scope of the invention as defined by the appended claims and their equivalents.

What is claimed is:

1. A restoration system, which optically picks up information from an optical disc and restores the information, the restoration system comprising:
    a slice which samples a signal optically picked up from the optical disc;
    a phase locked loop which receives a signal output from the slice and generates a channel clock signal;
    a latch circuit which receives the signal output from the slice and the channel clock signal, and outputs the signal output from the slice in response to the channel clock signal;
    a 3T correction circuit which receives the channel clock signal, the signal output from the slice, and the signal output from the latch circuit and outputs a signal in which 3T is corrected, wherein the 3T correction circuit comprises:
    an extension storage device, which stores the signal output from the latch circuit in a predetermined storage device in response to the channel clock signal of the phase locked loop, outputs a storage state, and outputs stored data in response to a signal output from an extension determiner;
    a length measuring device, which receives the storage state from the extension storage device, detects a period of a predetermine pulse of the storage state, the length measuring device measures periods of previous and next pulses respectively before and after the predetermined pulse signal, and outputs a current length of the predetermined pulse, a previous length of the previous pulse, and a next length of the next pulse according to a measurement of the periods;
    a phase detector, which measures a phase difference between the channel clock signal and the signal output from the slice and outputs, according to a measurement, a leading phase, which indicates a difference between the signal output from the slice and the channel clock signal when the predetermined pulse is enabled, a trail phase, which indicates a difference between the signal output from the slice and the channel clock signal when the next pulse is enabled, and a previous phase, which indicates a difference between the signal output from the slice and the channel clock signal when the previous pulse is enabled; and
    an extension determiner, which receives the current length, the previous length, the next length, the leading phase, the trail phase, and the previous phase and determines a need for a correction and a direction of the correction by:
        determining whether the current length is less than 2T;
        selecting a two directional correction or a non-correction if the current length is less than 2T; and
        selecting a forward correction or a backward correction if the current length is equal to 2T, wherein the selection of one of the two directional correction and non-correction comprises:
        determining whether the current length is equal to 1T;
        selecting the non-correction if the current length is not equal to 1T; and
        selecting the non-correction when both the previous length and the next length are less than or equal to 3T, and selecting the two directional correction when both the previous length and the next length are greater than 3T, if the current length is equal to 1T; and
    a demodulator which demodulates the signal output from the 3T correction circuit.

2. The restoration system of claim 1, wherein the extension storage device comprises a plurality of shift registers.

3. A restoration method, which restores a signal in which 3T is corrected by using a signal output from a slice that samples a signal optically picked up from an optical disc, a channel clock signal output from a phase locked loop that receives a signal output from the slice, and a signal output from a latch circuit that receives the signal output from the slice and the channel clock signal and outputs the signal output from the slice in synchronization with the channel clock signal, the method comprising:
    detecting a current length of a current pulse of the signal output from the latch circuit, a previous length of a previous pulse immediately before the current pulse, and a next length of a next pulse immediately after the current pulse, a leading phase, which indicates a difference between the channel clock signal and the signal output from the slice when the signal output from the slice is enabled, a trail phase, which indicates a difference between the signal output from the slice and the channel clock signal when the next pulse is enabled, and a previous phase, which indicates a difference between the signal output from the slice and the channel clock signal when the previous phase is enabled;
    determining whether the current length is less than 2T;
    selecting a two directional correction or a non-correction if the current length is less than 2T; and
    selecting a forward correction or a backward correction if the current length is equal to 2T, wherein the selection of one of the two directional correction and non-correction comprises:
        determining whether the current length is equal to 1T;
        selecting the non-correction if the current length is not equal to 1T; and
        selecting the non-correction when both the previous length and the next length are less than or equal to 3T, and selecting the two directional correction when both the previous length and the next length are greater than 3T, if the current length is equal to 1T.

4. The restoration method of claim 3, wherein the selection of one of the forward correction and backward correction comprises:
   selecting the forward correction if the previous length is greater than 3T and the next length is less than or equal to 3T;
   selecting the backward correction if the previous length is less than or equal to 3T and the next length is greater than 3T;
   selecting the forward correction if both the next phase and the trail phase have a first phase error or the previous phase has a second phase error, when both the previous length and the next length are greater than 3T; and
   selecting the backward correction if both the next phase and the trail phase have the second phase error or the previous phase has the first phase error, when both the previous length and the next length are greater than 3T.

5. The restoration method of claim 4, wherein the first phase error indicates that the signal output from the slice is fast and the second phase error indicates that the signal output from the slice is slow.

6. A signal correction circuit for a signal received from an optical disk, the system comprising:
   an extension storage device for storing the signal output from a latch circuit in a predetermined storage device in response to a channel clock signal;
   a length measuring device for measuring lengths of a predetermined current pulse sourced from the extension storage device, a previous pulse that precedes the current pulse, and a next pulse that succeeds the current pulse, and to output a current length, a previous length, and a next length;
   a phase detector for measuring a phase difference between the channel clock signal and the signal output from a slice, the phase detector outputs a leading phase, a trail phase, and a previous phase; and
   an extension determiner, receiving and utilizing the lengths of the current pulse, the previous pulse, the next pulse, the leading phase, the trail phase, and the previous phase for selecting one of a non-correction, a two-directional correction, a forward correction, and a backward correction, wherein the non-correction is selected when both the previous length and the next length are less or equal to 3T.

7. The signal correction circuit of claim 6, wherein the extension storage device outputs a storage state to the length measuring device, the extension storage device outputs stored data to the length measuring device in response to a signal output from the extension determiner.

8. The signal correction circuit of claim 7, wherein the length measuring device receives the storage state outputted from the extension storage device, the length measuring device detects at least one period of 2T and 1T of the predetermined current pulse of the storage state, the length measuring device measures periods of the previous pulse and the next pulse to determine the lengths of the current pulse, the previous pulse and the next pulse.

9. The signal correction circuit of claim 8, wherein the phase detector output of the leading phase representing a difference between the signal output from the slice and the channel clock signal when the predetermined current pulse is enabled, the trail phase representing a difference between the signal output from the slice and the channel clock signal when the next pulse is enabled, the previous phase representing a difference between the signal output from the slice and the channel clock signal when the previous pulse is enabled.

10. The signal correction circuit of claim 6, wherein the extension storage device comprises:
   a plurality of shift registers.

11. The signal correction circuit of claim 6, further comprising:
   a demodulator for demodulating the output of the signal correction circuit, wherein the slice samples the signal optically picked up from the optical disk, the latch circuit receives the signal output from the slice and the channel clock signal, and the latch circuit outputs the signal output from the slice in response to the channel clock signal.

12. A restoration method, which restores a signal in which 3T is corrected by using a signal output from a slice that samples a signal optically picked up from an optical disc, a channel clock signal output from a phase locked loop that receives a signal output from the slice, and a signal output from a latch circuit that receives the signal output from the slice and the channel clock signal and outputs the signal output from the slice in synchronization with the channel clock signal, the method comprising:
   measuring a current length of a current pulse of the signal output from the latch circuit, a previous length of a previous pulse immediately before the current pulse, and a next length of a next pulse immediately after the current pulse;
   detecting a leading phase, which indicates a difference between the channel clock signal and the signal output from the slice when the signal output from the slice is enabled, a trail phase, which indicates a difference between the signal output from the slice and the channel clock signal when the next pulse is enabled, and a previous phase, which indicates a difference between the signal output from the slice and the channel clock signal when the previous phase is enabled; and
   selecting one of a non-correction, a two-directional correction, a forward correction, and a backward correction, wherein the non-correction is selected when both the previous length and the next length are less or equal to 3T.

13. The method of claim 12, wherein the two-directional correction is selected when both the previous length and the next length are greater than 3T and the current length is equal to 1T.

14. The method of claim 13, wherein one of the forward correction or the backward correction is selected when the current length is equal to 2T.

15. The method of claim 14, wherein the forward correction is selected when the next length is less or equal to 3T and the previous length is greater than 3T.

16. The method of claim 15, wherein the backward correction is selected when the next length is greater than 3T and the previous length is less or equal to 3T.

17. The method of claim 16, wherein the forward correction is selected when both the leading phase and the trail phase are fast.

18. The method of claim 17, wherein the backward correction is selected when both the leading phase and the trail phase are slow.

19. The method of claim 18, wherein the forward correction is selected when the previous phase is slow.

* * * * *